July 6, 1948.  G. W. ERICKSON  2,444,597
DUCK RETRIEVER
Filed March 17, 1945
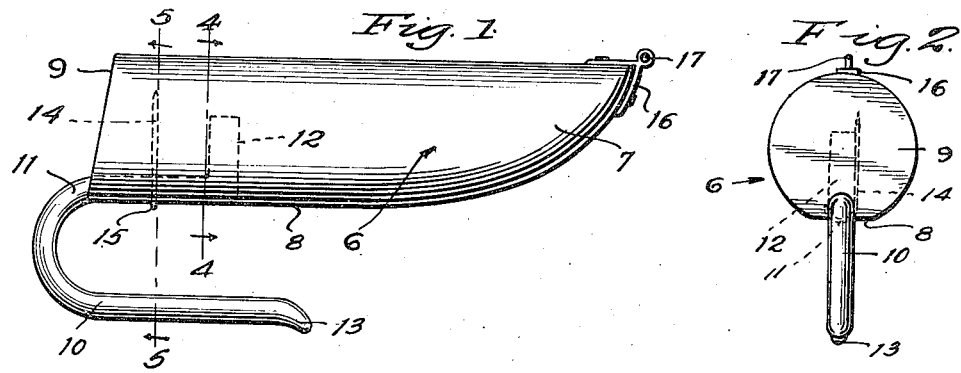
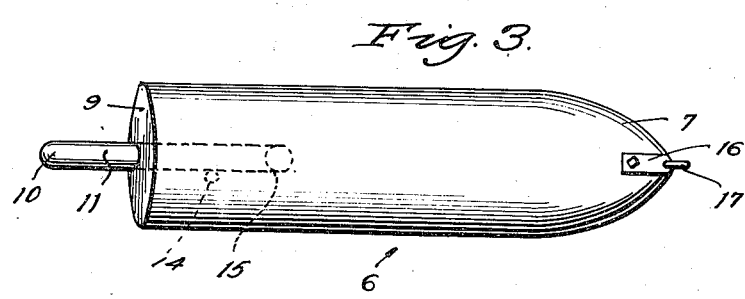
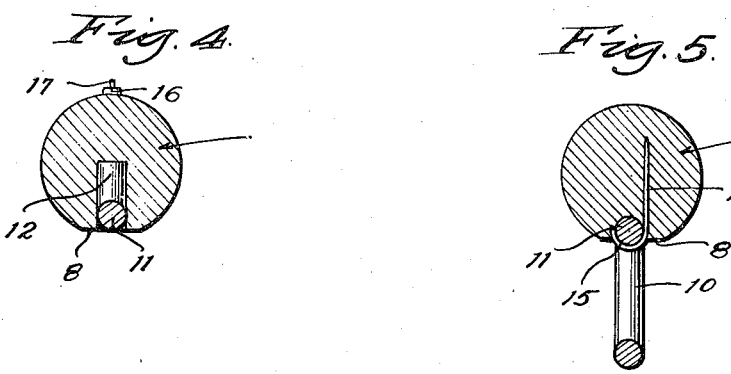
Inventor
George William Erickson
By Clarence A. O'Brien
and Harvey B. Jacobson
Attorneys Patented July 6, 1948

2,444,597

UNITED STATES PATENT OFFICE 2,444,597

DUCK RETRIEVER

George William Erickson, Rice Lake, Wis.

Application March 17, 1945, Serial No. 583,351

2 Claims. (Cl. 43—49)

The present invention relates to a novel and practical device for readily and conveniently snaring and hauling in ducks that have been shot down to float on a body of water, the same being generally and aptly identified as a duck retriever.

The retriever is similar to a casting plug, and can be cast or otherwise catapulted to a convenient pickup and retrieving spot by a conventional casting rod and reel assembly such as used by fishermen.

The device consists of a wooden or plastic body or plug, of sufficient weight to facilitate the aforementioned casting step, and yet being susceptible of floating. The principal innovation and outstanding feature of the device is a substantially U-shaped snaring hook, attached to the rear of the plug, which is of sufficient size to encircle the neck of a duck when used in the intended manner.

Another object of the invention has to do with the provision of a floatable plug having an eye at one end for the casting and reeling in line, said end being shaped similar to the bow of a boat, the opposite end being provided with a properly located and offset snaring hook whose inner limb or shank portion is anchored in the plug in such a manner as to facilitate its return travel through the water, this without the likelihood of blockade from weeds and similar debris.

Other features and advantages will become more readily apparent from the following description and the accompanying illustrative drawings.

In the drawings, wherein like numerals are employed to designate like parts throughout the views:

Figure 1 is a side elevational view of a so-called duck retriever constructed in accordance with the principles of the present invention, showing the approximate size of the snaring hook and its relationship of the plug.

Figure 2 is a rear end elevational view thereof.

Figure 3 is a top plan view.

Figures 4 and 5 are cross-sectional views taken approximately on the planes of lines 4—4 and 5—5 of Figure 1.

The device in actual practice is approximately the same size as indicated in the accompanying drawings. However, the size, shape and material can, of course, be varied slightly.

Referring to the drawings by distinguishing reference numerals, it will be seen that the numeral 6 designates the elongated, buoyant body or plug, is of wood, plastic or some suitable substantially waterproof stock. Generally speaking, the rear and central portion is circular in cross-sectional form. However, the normal front end is tapered to a pointed end shaped as indicated at 7 to represent the bow of a boat. A float thus shaped and designed facilitates gliding through water. The bottom is centrally and longitudinally flattened as indicated at 8 to provide a "keel," this also to facilitate satisfactory movements in and through the water. The rear end wall is essentially circular and slightly slanted rearwardly and downwardly as indicated at 9. At the rear end portion and formed in the bottom is a substantially L-shaped groove. The horizontal reach of said groove extends through the rear end on reach of the groove 9 while the inner end is at right angles and provides a socket 9a.

The so-called snaring hook is denoted by the numeral 10, this being of proper proportions and of general U-shaped form. The inner limb 11 is anchored in the horizontal portion of the L-shaped groove and the laterally bent inner end or prong 12 is lodged in the correspondingly disposed socket end of said groove. The entire hook, as a unit, is offset eccentrically with respect to the longitudinally axial dimension of the body. The free end or bill 13 is flared outwardly as indicated to facilitate expedient handling and operation thereof.

I also provide a suitable fastening as at 14, this being a nail or the like, and this is driven into the body and provided at its outer end with a hook 15 which surrounds and sufficiently embraces the limb 12 to assist in securely anchoring the hook, as a unit, in place.

At the frontal end portion I provide a substantially V-shaped clip 16, this being suitably fastened in place and provided at its vertex portion with an eye 17. The eye is adapted to accommodate an ordinary fishing line (not shown).

In use, the retriever is cast out beyond the dead, floating duck, with an ordinary casting rod. The hunter holds the rod tip high so that the line is above the water, and walks along the shore one way or the other until the line is directly over the duck. He then lets the line down on the duck and reels in gently. When the retriever hits the floating duck, which almost invariably has its neck extended, the hunter eases it along the side of the duck until it can be pulled directly over the duck's neck. The hook then engages the neck and the duck can be reeled in. The duck's head prevents the hook from slipping off.

The front end of the retriever is rounded, as at 7, permitting it to slide past weeds readily. The hook is blunt on the bill end to also facilitate sliding past lily pads, weeds or snags.

The plug itself can be made from wood or plastic. It is brightly colored to enable the hunter to see it readily when floating on the water early in the morning or at dusk. The plug floats just enough to make it slide easily over the duck's neck, with the hook hanging below. It is heavy enough so that it can be thrown or cast a long distance with ease. With a bit of practice, any hunter can retrieve ducks readily.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A duck retriever of the class described comprising a float in the form of a plug of sufficient size and buoyancy to support a duck while being dragged through a body of water to a landing spot, said plug being substantially circular in transverse cross sectional shape, having a flat surfaced bottom portion to ride through the water and functioning as a stabilizing and righting means, the forward end of said float being tapered and pointed and merging into the flat bottomed portion to guide and facilitate movement of the float through the water, means on said forward end to accommodate a casting and reeling line, and a U-shaped hook of a size sufficient to snare the neck of the duck to be retrieved, said hook being eccentrically positioned in relation to the longitudinal axis of the float and having one limb secured to the float, its bight portion projecting beyond one end of the float and the remaining limb disposed in approximate parallelism to the first limb and the peripheral surface of said float.

2. A duck snaring and retrieving device of the class described comprising an elongated plug of buoyant material, said plug being of a size and degree of buoyancy to lend it adaptable to accomplish desired snaring and hauling results, said plug being, for the main portion of its length, substantially circular in transverse section, the forward end portion of said plug being tapered to a point and defining a shape representing the bow of a boat, the rear end portion of said plug having its normal bottom longitudinally and centrally flattened, said bottom being provided with a radial socket and a longitudinal groove, said groove being in alignment with a longitudinally flattened portion and communicating at its inner end with said socket, and an eccentrically positioned duck snaring and retrieving hook of general U-shaped form, said hook having its innermost limb arranged in said groove, the free end of said limb being provided with a lateral prong seated in said socket, the bight portion of the hook projecting slightly beyond the adjacent rear end of the plug and the outermost limb extending in spaced parallelism alongside the first limb and the adjacent peripheral surface of said plug.

GEORGE WILLIAM ERICKSON.

REFERENCES CITED

The following references are of record in the file of this patent:

UNITED STATES PATENTS

| Number | Name | Date |
|---|---|---|
| 295,369 | Dickinson | Mar. 18, 1884 |
| 696,433 | Heddon | Apr. 1, 1902 |
| 763,726 | Cook | June 28, 1904 |
| 1,596,631 | Siebold | Aug. 17, 1926 |
| 2,055,841 | Haislip | Sept. 29, 1936 |
| 2,258,080 | Thomas et al. | Oct. 7, 1941 |
| 2,274,596 | Fink | Feb. 24, 1942 |